(12) United States Patent
Rose

(10) Patent No.: US 6,252,167 B1
(45) Date of Patent: Jun. 26, 2001

(54) SYSTEM AND METHOD FOR SUPPRESSING FIRE IN ELECTRICAL BOXES

(76) Inventor: Elmer Algin Rose, 4643 Campbell Dr., SE. #242, Salem, OR (US) 97301

( * ) Notice: Subject to any disclaimer, the term of this patent is extended or adjusted under 35 U.S.C. 154(b) by 0 days.

(21) Appl. No.: 09/243,898

(22) Filed: Feb. 3, 1999

(51) Int. Cl.$^7$ .................................................. H02G 3/14
(52) U.S. Cl. ............................................. 174/66; 220/241
(58) Field of Search ........................ 174/50, 66; 220/3.2, 220/241, 3.8; 52/232

(56) References Cited

U.S. PATENT DOCUMENTS

| | | | |
|---|---|---|---|
| 3,965,629 | * | 6/1976 | Pearson ............................... 52/232 X |
| 4,072,316 | * | 2/1978 | Decker et al. .................... 277/235 B |
| 4,163,137 | * | 7/1979 | Close, Jr. .......................... 220/242 X |
| 4,270,318 | * | 6/1981 | Carroll et al. ..................... 52/232 X |
| 4,432,465 | * | 2/1984 | Wuertz .............................. 220/232 X |
| 4,447,484 | * | 5/1984 | Slosberg et al. .................. 174/66 X |
| 4,573,297 | * | 3/1986 | Benscoter et al. ................ 52/232 X |
| 4,667,840 | * | 5/1987 | Lindsey .................................. 220/3.2 |
| 4,733,330 | * | 3/1988 | Tanaka et al. .................... 174/66 X |
| 5,675,125 | * | 10/1997 | Hollinger ............................ 174/66 |
| 5,681,640 | | 10/1997 | Kiser . |

* cited by examiner

*Primary Examiner*—Dean A. Reichard
(74) *Attorney, Agent, or Firm*—Chernoff, Vilhauer, McClung & Stenzel LLP

(57) ABSTRACT

A method for suppressing electrical fires provides an electrical box which defines an opening for access to the electrical box. The electrical box includes therein either an electrical device or an electrical cable. A support is sized to cover a majority of the opening. An intumescent material is applied to the support. The support is mounted adjacent to the opening so that the support covers a majority of the opening. The intumescent material expands in response to heat generated within the electrical box to suppress a fire within the electrical box.

26 Claims, 3 Drawing Sheets

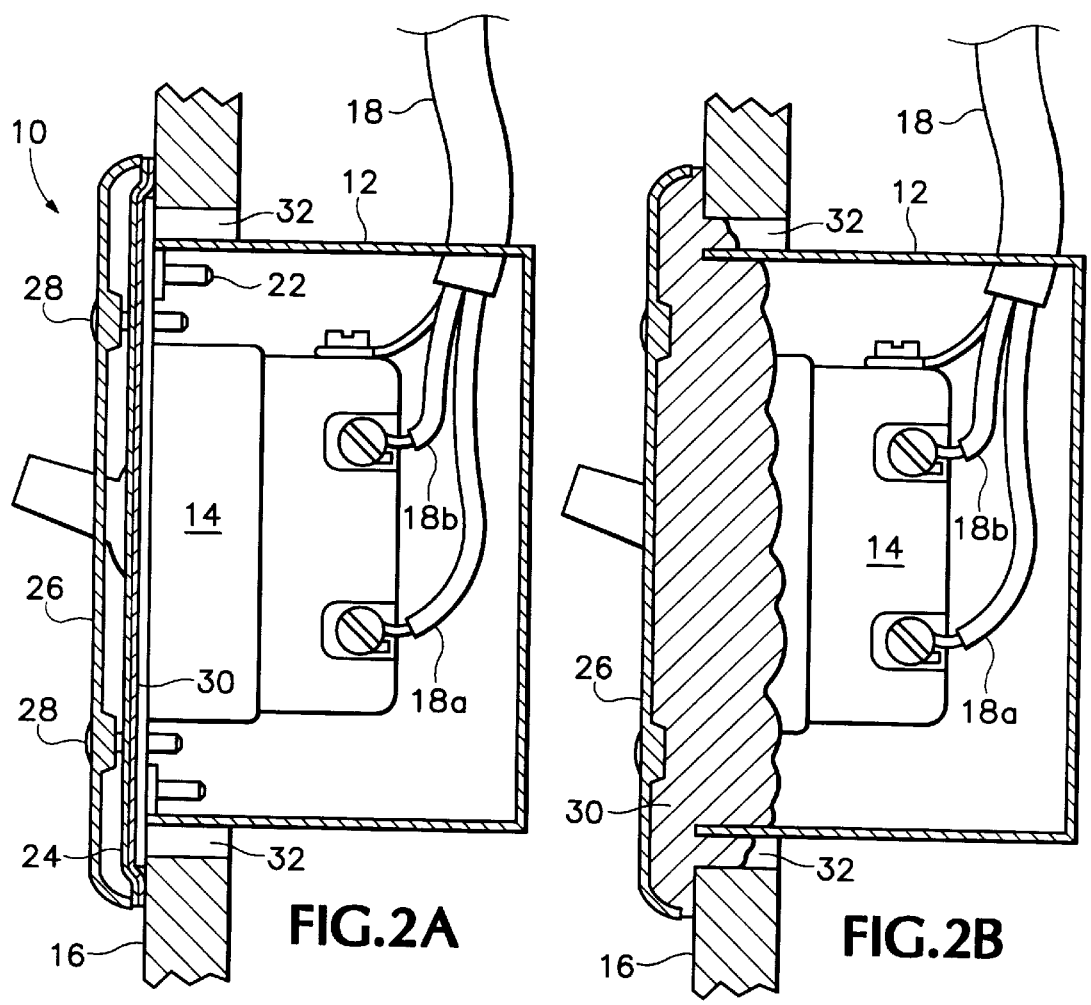
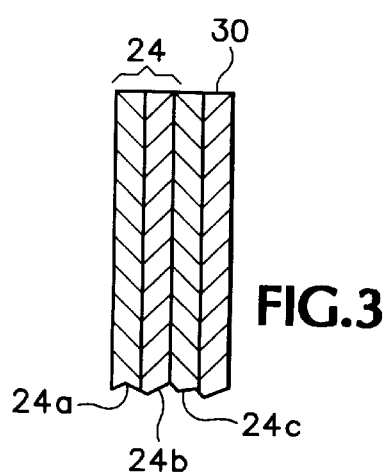

SYSTEM AND METHOD FOR SUPPRESSING FIRE IN ELECTRICAL BOXES

BACKGROUND OF THE INVENTION

The present invention relates generally to the suppression of fires in electrical boxes and more particularly to the use of an intumescent material to suppress fires within an electrical box.

It is well known that electrical fires are one of the most common sources of fires in the home and elsewhere. In the home, electrical fires may occur within electrical boxes, which may house either electrical devices or electrical connections such as cable splices. A typical electrical box consists of a box made of metal or plastic which may be rectangular or round and which has an open face for access to the inside of the box. Openings are provided in the sides or back of the box for insertion of electrical cables. An electrical device such as a light switch or outlet plug is mounted within the box, and the box is often installed in an opening in a wall. A plastic or metal cover plate is then attached to the electrical device to cover the electrical box and to provide a pleasing outward appearance.

Fires within electrical boxes present particular hazards for the home or other buildings in which they occur. Electrical boxes which contain switches or outlet plugs are typically housed within the walls of the building. If a fire starts in the electrical box, it may spread to the surrounding wood frame and quickly travel throughout the inside wood framing of the structure. Electrical fires also can be hard to detect because they begin within an enclosed electrical box. Thus, they may be well underway before emitting smoke. Further, electrical devices are often placed within the vicinity of plastic or synthetic materials, and thus such fires can produce toxic or hazardous fumes and smoke.

Currently, there are no systems which adequately suppress fires which begin in an electrical box. It has been known generally to use intumescent materials to protect and insulate items from a fire. Intumescent materials are products that "grow" or "thicken" when exposed to heat, creating an insulated layer that separates the protected item from the fire. Conventionally, intumescent materials are applied to the exterior of an item to insulate it from a fire. For example, intumescent materials have been used to create a fire-resistant/retardant wrap suitable for protecting the exterior of conduits and cable trays and the like from a fire. Such a system is described in Kiser, U.S. Pat. No. 5,681,640. In addition, intumescent materials have been applied to large sheets of insulated material for use as an exterior wrap which may be applied to the exterior of a building. However, the exterior application of such intumescent materials, while protecting the material or structure surrounded by such intumescent materials from fire, does not actively suppress fires that begin within an enclosed area, or protect against fires which begin in an enclosed area such as an electrical box.

Accordingly, there is still a need for a system that suppresses fires that begin within an electrical box, that insulates the exterior plate from a fire within an electrical box, that prevents smoke from exiting from an electrical box fire, that is easy to install, and that is cost-effective.

SUMMARY OF THE INVENTION

The present invention overcomes the drawbacks of the prior art by providing a system for suppressing electrical fires within an electrical box. A first aspect of the invention provides an electrical box defining an opening for access to the electrical box and includes therein an electrical device or an electrical cable. A support is sized to cover a majority of the opening. An intumescent material is applied to the support. The support is mounted adjacent to the opening so that the intumescent material covers a majority of the opening.

In addition, the present invention provides a method for suppressing fires in an electrical box. An electrical box is provided which defines an opening for access therein and which contains either an electrical device or an electrical cable. A support is provided which is sized to cover a majority of the opening. An intumescent material is applied to at least one side of the support. The support is mounted adjacent to the opening so that the intumescent material covers a majority of the opening. The intumescent material expands in response to heat generated within the electrical box.

In another aspect of the present invention, an electrical box is provided which defines an opening for access therein and which contains either an electrical device or an electrical cable. A layer of intumescent material covers a substantial portion of the opening.

In still another aspect of the present invention, an electrical box is provided which defines an opening for access therein which contains either an electrical device or an electrical cable. A cover plate is attached to the electrical box and covers the opening. The electrical box contains an intumescent material.

The present invention has at least one or more of the following advantages over the prior art. The present invention, by providing an intumescent material which either covers at least a majority of the opening of an electrical box or is inside the electrical box, actively suppresses a fire within the electrical box by expanding the intumescent material into the electrical box in response to heat generated by a fire in the electrical box. The expanding intumescent material provides an insulated layer which prevents the cover plate from melting or deteriorating. The expanding intumescent material may expand into or over the electrical device or electrical connection, thus directly suppressing the fire at its source. The expanding intumescent material also fills the cracks and voids between the electrical box, surrounding wall and/or the cover plate so as to prevent smoke from exiting the electrical box. Further, by expanding to fill the cracks and voids, the intumescent material cuts off a draft which may accelerate the fire within the electrical box. Because the intumescent material is provided on only a small support, the system is easy to install and is cost-effective due to the small area on which the intumescent material is applied.

The foregoing and other features and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2A is a sectional view along the line 2A of FIG. 1 showing the rear portion of the electrical box broken away.

FIG. 2B shows the same sectional view as in FIG. 2A, but shows expansion of the intumescent material.

FIG. 3 shows an exemplary embodiment of a support of the present invention.

FIG. 4 shows an alternative embodiment of the support of the present invention.

DETAILED DESCRIPTION OF THE PREFERRED EMBODIMENTS

The present invention relates to a system and method for suppressing fires in an electrical box and more particularly to the use of an intumescent material in connection with an electrical box.

Figure 1:
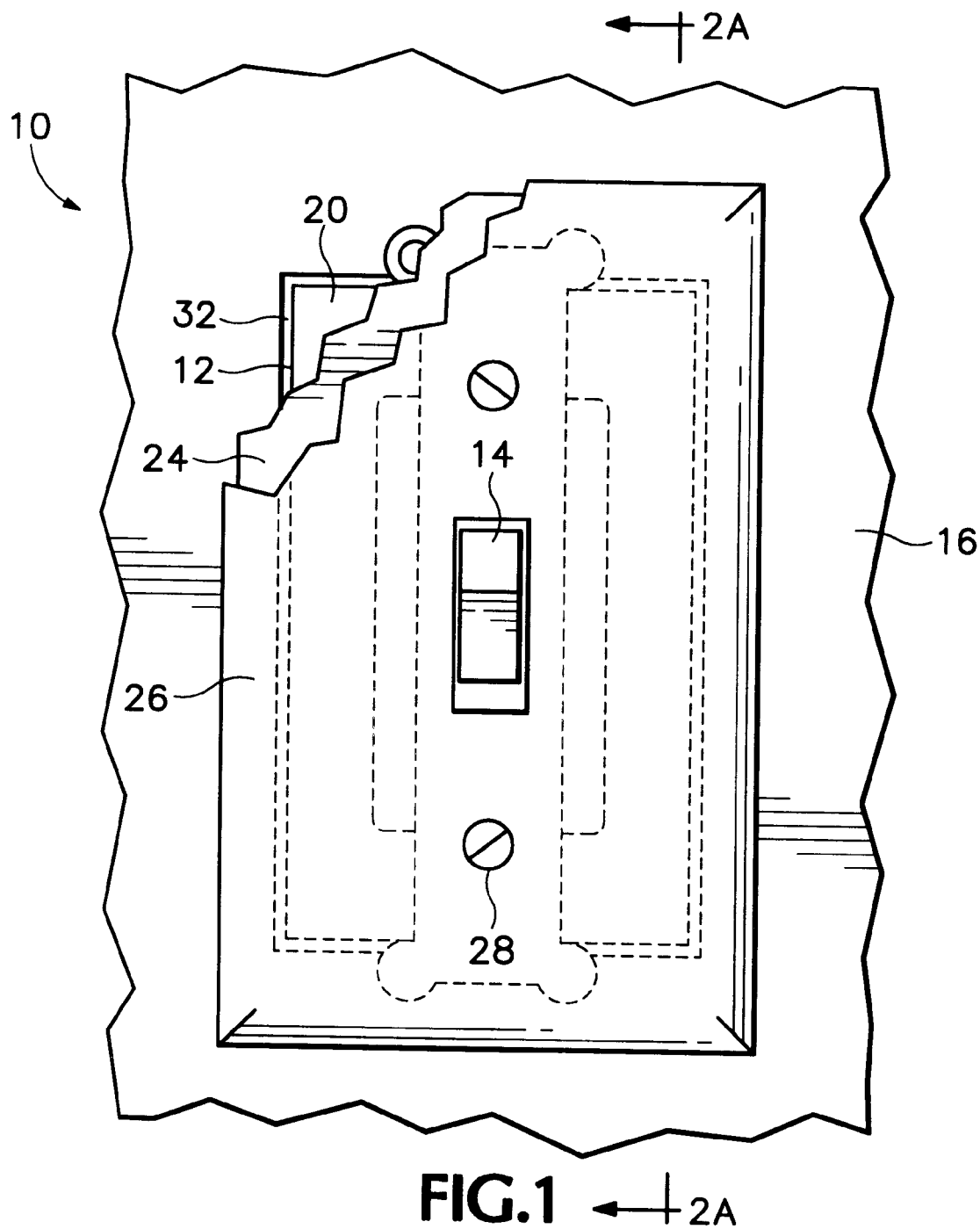
FIG. 1 shows a front elevational view of an exemplary embodiment of the present invention, showing a cover plate which is partially broken to reveal the underlying support, electrical device and electrical box.

Referring now to the drawings, and initially to FIG. 1, it is emphasized that the figures and/or drawings are not intended to be to scale. For example, purely for the sake of greater clarity in the drawings, layer thicknesses and spacings are not dimensioned as they exactly exist in the assembled embodiments.

FIGS. 1 and 2A illustrate one embodiment of a system 10 that is used for suppressing fires in an electrical box. An electrical box 12 such as a device box contains an electrical device 14 which is mounted to a wall 16. The electrical box 12 may be of any standard construction. Typically, such electrical boxes are made from either plastic or other synthetic material or metal. Such electrical boxes typically have one or more openings in the side or rear to allow insertion of one or more electrical cable(s) 18 into the electrical box 12. The electrical box 12 generally defines an opening 20 in the front of the electrical box 12 which allows access into the interior of the electrical box 12. The electrical box 12 may be attached to the interior framing of a structure such as a building or home. The wall 16 defines an opening, for example, in the surrounding sheetrock, slightly larger than the outer perimeter of the electrical box 12 to allow access to the opening 20 in the electrical box 12. The electrical box 12 is typically mounted so that the front portion of the electrical box 12 is flush, or nearly flush, with the exterior of the wall 16.

The electrical box 12 may contain an electrical device 14, which is usually mounted to the electrical box 12. FIG. 1 shows screws 22 attaching the electrical device 14 to the electrical box 12. The electrical device 14 may be any electrical device used in a home or structure and which is housed within an electrical box 12. For example, the electrical device 14 may be a light switch, dimmer switch, electrical outlet, fan switch, thermostat, garage door opening switch, or the like. The electrical box 12 also may contain an electrical connection, such as a splice between two wires or an electrical connection from a wire of electrical cable 18 to the electrical device 14. For example, FIG. 2A shows the electrical device 14 connected to the individual wires 18a and 18b of the electrical cable 18. A cover plate 26 is attached by screws 28 to the electrical device 14.

Contrary to the conventional approach to utilizing intumescent materials, the present invention achieves its advantages by providing an intumescent material 30 within the interior of the electrical box 12. In one embodiment shown in FIGS. 1 and 2A, a support 24 is provided on which a layer of intumescent material 30 has been applied. The support 24 may be made of any suitable material which can absorb or otherwise to which can be applied a sufficient quantity of intumescent material 30. For example, the support may be a gasket on which a layer of intumescent material 30 has been applied to one side. The support 24 may be comprised of one or more layers. Alternatively, the support 24 could be a piece of plastic or metal on which a layer of intumescent material 30 has been applied. The actual materials used for the support 24 are not important, so long as the intumescent material 30 remains applied to the support 24. The support 24 is attached to the electrical box 12 so that the intumescent material 30 faces toward the interior of the electrical box 12.

The intumescent material 30 may be applied to the support 24 by dissolving the intumescent material 30 in a solvent, and applying the solution of solvent and intumescent material 30 to the support. Upon drying of the solvent, the intumescent material 30 remains on the support 24 as a layer. For example, FIG. 3 shows one embodiment of the support 24. The support in FIG. 3 is a gasket comprised of a layer of waxed fabric 24b attached to a thin layer of polyester 24c. The gasket is supplied by Northern Technologies International Corp. of Valdosta, Ga. The intumescent material 30 is applied as a layer to the support 24, preferably 35 mils thick. In a preferred embodiment, the support 24 includes a layer of adhesive 24a used to attach the support 24 to the cover plate 26.

Alternatively, as illustrated in FIG. 4, the intumescent material 30 may be supported instead by cover plate 26, and the support 24 may be eliminated. The intumescent material 30 may be applied to the cover plate 26 by dissolving the intumescent material in a solvent, and pouring the resulting solution into the cover plate 26 which simultaneously serves as a mold and a support. Upon drying, a layer of intumescent material 30 is directly applied to the cover plate 26. Alternatively, the intumescent material 30 may be attached to the cover plate 26 as a layer by either mechanical fastening devices or adhesives.

As another alternative, the intumescent material 30 may itself be formed into a cover plate 26. In such an embodiment, the intumescent material 30 would be formed into a cover plate 26 by pouring a solution of the intumescent material 30 and a solvent into a suitable mold. The intumescent material 30 and solvent may further include thickening or stiffening agents to provide a cover plate 26 having greater mechanical strength than the intumescent material alone.

The intumescent material suitable for use in the present invention is a material that "grows" or "thickens" when exposed to heat. Examples of intumescent materials that can be used in the present invention are 3M CP-25 caulking material that can be obtained from 3M Fire Protection Products, St. Paul, Minn., or FX-100 coating material available from Flame Seal Products, Inc., Houston, Tex. The greater the expansion capacity of the intumescent material utilized in the invention, the greater the fire suppressing ability of the system. Preferred intumescent materials will have an expansion capability of 700% or more. However, intumescent materials having lesser degrees of expansion may suffice.

The reaction temperature of most intumescent materials is 300° F. to 400° F. The exterior portion of the intumescent material directly facing the fire or heat source will expand when the temperature at the surface of the intumescent material reaches the reaction temperature. As the intumescent material expands, it insulates the remainder of the intumescent material from the source of heat. Additional amounts of intumescent material will not begin to expand until the reaction temperature has been reached internally. Accordingly, a moderate layer of intumescent material, for example 35 mils thick, will not completely expand until the external temperature, applied to the exterior portion of the intumescent material, exceeds 1000° F. A thin layer of intumescent material 35 mils thick can expand to approximately 3½ inches in thickness when fully activated. In general, each 10 mils of intumescent material expands to approximately 1 inch thick when completely reacted. The amount of intumescent material used in the present invention will necessarily depend on the expansion properties of the intumescent material. Preferably, the intumescent material will fill at least 75% of the electrical box 12 when fully reacted.

Referring again to FIG. 1, the support 24 is sized to cover a majority of the opening 20 of the electrical box 12. Preferably, the support 24 covers substantially all of the opening 20, or at least as much as is practical. Since the electrical device 14 may have parts, such as a switch, which protrude from the electrical device, the support 24 may have small openings to allow these parts to extend through the support 24. The support 24 is mounted adjacent to the opening 20 so that the support 24 covers a majority of the opening 20 of the electrical box 12. The support 24 is arranged with respect to the opening 20 so that the intumescent material 30 faces inward toward the electrical device 14 and the electrical box 12. The cover plate 26 is attached to the electrical box 12 over the support 24. For aesthetic reasons, it is preferred that the support 24 be sized so that it is no larger than the cover plate 26, so that the support 24 does not extend beyond the cover plate 26.

Where the electrical box 12 is mounted adjacent to a wall 16, there is typically a small air gap 32 between the outer periphery of the electrical box 12 and the opening in the wall 16. It is preferred that the support 24 be sized to cover not only a majority of the opening in the electrical box 12, but also a majority of the air gap 32. Preferably, the support 24 covers substantially all of the air gap 32 between the wall 16 and the electrical box 12.

In the event of a fire in the electrical box 12, the heat generated thereby will cause the intumescent material 30 on the support 24 to begin to expand. Because the intumescent material 30 faces inward toward the opening 20 of the electrical box 12, it will expand in toward the fire. As illustrated in FIG. 2B, the expanding intumescent material 30 will fill the air gaps 32 between the wall 16 and the electrical box 12. In addition, it will begin to expand around the electrical device 14 and into the electrical box 12, thus suppressing the fire. The intumescent material 30 insulates the cover plate 26 from the fire in the electrical box 12, thus protecting the cover plate 26 from melting. The expanding intumescent material 30 also prevents smoke from exiting the electrical box 12, and further cuts off a draft through the air gaps 32 between the wall 16 and electrical box 12 which would provide a source of oxygen for the fire.

The system 10 is very easy to install, since it simply requires installation of a support 24 between the cover plate 26 and the electrical box 12. The system 10 is also very inexpensive, because the intumescent material 30 only needs to be applied to a very small area, i.e., the size of the support 24. Thus, the expense of applying the intumescent material 30 is relatively small, while the intumescent material 30 is applied directly adjacent to the area most likely to cause a fire.

The support 24 may be mounted to the electrical box 12 in a variety of ways. For example, the support 24 may be held against the electrical box 12 by tightening the cover plate 26 with screws 22 against the electrical device 14 to hold the support 24 in place. Alternatively, a layer of adhesive 24a may be applied to the support 24. The layer of adhesive 24a may be used to adhere the support 24 to the cover plate 26.

In another aspect of the invention, the intumescent material 30 itself also serves as the cover plate 26 for the electrical box 12. As discussed above, the intumescent material may be molded into a rigid cover plate 26 for the electrical box 12. In this embodiment, the intumescent material may be attached to the electrical box 12 in any conventional manner, such as using screws, other mechanical fastening devices, or adhesives. This embodiment has the advantage of greatly simplifying the number of parts needed to complete the system 10 in that only the intumescent material 30, electrical device 14 and electrical box 12 are required. This decreases the installation time for the system 10.

Figure 6:
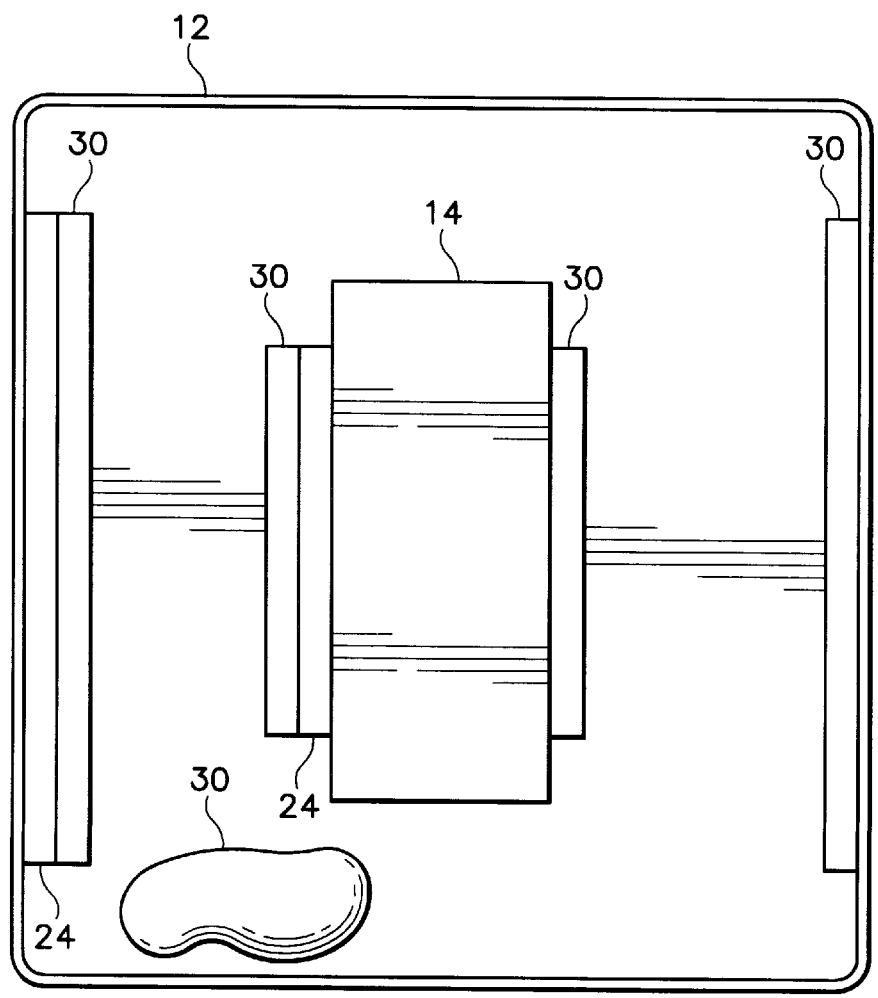
FIG. 6 shows an alternative embodiment of the present invention.

Another aspect of the invention is shown in FIG. 6. As before, the electrical box 12 contains an electrical device 14 and/or an electrical cable (not shown). The electrical box 12 contains within it the intumescent material 30. The intumescent material 30 may be provided in a variety of forms. In one aspect, the intumescent material 30 is applied to a support 24 which is attached by screws, other conventional fastening devices, or adhesives to an interior surface of the electrical box 12. For example, the intumescent material 30 may be applied to a gasket which is then adhered to an interior surface of the electrical box 12 or to the electrical device 14. Alternatively, the intumescent material 30 may be applied directly to the interior of the electrical box 12, or directly to an exterior surface of the electrical device 14. FIG. 6 illustrates these alternatives.

Also referring to FIG. 6, in another alternative, the intumescent material 30 is provided in a pill, tablet or packet form which is placed inside the electrical box 12. The term "pill" is intended to mean, broadly, a physical piece of intumescent material 30, without regard to any particular form or shape of intumescent material 30. The term "packet" simply means that the intumescent material may be contained within plastic, paper or other material, so long as the material does not provide any significant insulation so as to prevent the intumescent material from expanding in response to heat generated from within the electrical box. The pill, tablet or packet may be adhered or attached to the interior of the electrical box 12, the electrical device 14, or the cover plate 26, or may simply be placed inside the electrical box 12 without attaching the intumescent material 30 to any surface. By placing the intumescent material 30 inside the electrical box 12 in any of the alternatives discussed above, the system achieves the advantages of providing an intumescent material 30 inside the electrical box 12 to suppress a fire.

Figure 5:
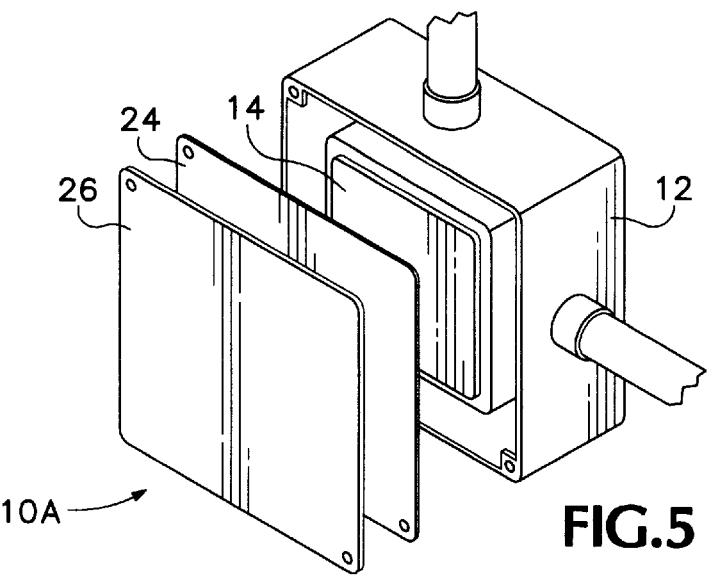
FIG. 5 shows a perspective view of another embodiment of the present invention.

As will be apparent, the present invention may be used in a variety of environments where electrical connections or electrical devices are used. As used herein, the term "electrical box" includes not only device boxes as discussed above, but also junction boxes, conduit bodies, load centers, fixture boxes, breaker boxes, fuse boxes and the like. For example, the present invention is suitable for use in connection with electrical connections or electrical devices housed within a junction box. Such junction boxes may be present in, for example, light fixtures, motors, appliances, or other equipment. The junction boxes house either electrical devices themselves, or the electrical splices or wire terminations. FIG. 5 shows, generally, such a system 10A having a junction box 12A, an electrical device 14, a support 24 for the intumescent material, and a cover plate 26.

The present invention may also be used in connection with conduit bodies. A conduit body has an opening for access to the cables within the conduit. A plate covers the opening. The support to which the intumescent material is applied may be placed between the opening and the plate so as to cover at least a majority of, and preferably substantially all of, the opening.

The present system and method may also be used in connection with load centers, such as breaker boxes, fuse boxes and the like. A load center consists of a panel for electrical circuit breakers or a fuse box. The load center has a front cover which includes a door or dead front for accessing the circuit breakers or the fuse box. The support to which the intumescent material has been applied may be placed along the inside of the front cover. Similarly, the support could be placed along the inside of the door as well.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for suppressing electrical fires, comprising:
   (a) an electrical box defining an opening for access therein and including therein at least one of an electrical device and an electrical cable;
   (b) a support sized to cover a majority of said opening;
   (c) an intumescent material applied to said support, said intumescent material being capable of expanding by at least 200% when exposed to a temperature in excess of 400° F.; and
   (d) said support mounted adjacent to said opening so that said intumescent material covers at least a majority of said opening.

2. The system of claim 1 wherein said intumescent material is present in a sufficient amount so as to fill a major portion of said electrical box when fully activated.

3. The system of claim 1 wherein said intumescent material expands by at least 700% when exposed to a temperature in excess of 400° F.

4. The system of claim 1, further comprising a cover plate attached to said electrical box.

5. The system of claim 1, further comprising an adhesive applied to said support.

6. The system of claim 5 wherein said adhesive adheres said support to a cover plate.

7. The system of claim 1 wherein said support covers substantially all of said opening.

8. The system of claim 1 wherein said support is a gasket.

9. The system of claim 1 wherein said support is a cover plate.

10. A method for suppressing fires in an electrical box, comprising:
    (a) providing an electrical box, said electrical box defining an opening for access therein and containing at least one of an electrical device and an electrical cable;
    (b) providing a support sized to cover a majority of said opening;
    (c) applying an intumescent material to said support, said intumescent material being capable of expanding by at least 200% when exposed to a temperature in excess of 400° F.;
    (d) mounting said support adjacent to said opening so that said support covers a majority of said opening; and
    (e) expanding said intumescent material in response to heat generated within said electrical box.

11. The method of claim 10 wherein said intumescent material is present in a sufficient amount so as to fill a major portion of said electrical box when fully activated.

12. The method of claim 10 wherein said support is a gasket.

13. The method of claim 10 wherein said support is a cover plate.

14. The method of claim 10, further comprising the step of attaching a cover plate to said electrical box.

15. The method of claim 10, further comprising the step of applying an adhesive to at least one side of said support.

16. The method of claim 15, further comprising the step of attaching said support to a cover plate with said adhesive and attaching said cover plate to said electrical box.

17. A system for suppressing electrical fires, comprising:
    (a) an electrical box defining an opening for access therein and including therein at least one of an electrical device and an electrical cable; and
    (b) a layer of intumescent material mounted adjacent to said opening so that said layer of intumescent material covers a substantial portion of said opening, said intumescent material being capable of expanding by at least 200% when exposed to a temperature in excess of 400° F.

18. The system of claim 17 wherein said layer of intumescent material is molded to form a cover plate.

19. The system of claim 17 wherein said intumescent material is present in a sufficient amount so as to fill a major portion of said electrical box when fully activated.

20. The system of claim 17 wherein said electrical box includes at least one of a light switch and an outlet plug.

21. A system for suppressing an electrical fire, comprising:
    (a) an electrical box defining an opening for access therein and including therein at least one of an electrical device and an electrical cable;
    (b) a removable cover plate attached to said electrical box for closing said opening; and
    (c) said electrical box containing therein an intumescent material, said intumescent material being capable of expanding by at least 200% when exposed to a temperature in excess of 400° F.

22. The system of claim 21 wherein said intumescent material is in the form of a layer attached to an interior surface of said electrical box.

23. The system of claim 21 wherein said layer of intumescent material is attached to said at least one of said electrical device and said electrical cable with an adhesive.

24. The system of claim 21 wherein said layer of intumescent material is applied to a support mounted adjacent to said opening.

25. The system of claim 21 wherein said intumescent material is in a form selected from the group consisting of a pill, a tablet and a packet.

26. The system of claim 21 wherein said intumescent material is present in a sufficient amount so as to fill a major portion of said electrical box when fully activated.

* * * * *